M. CANTONI.
Ox-Yoke and Bow.
No. 222,010. Patented Nov. 25, 1879.
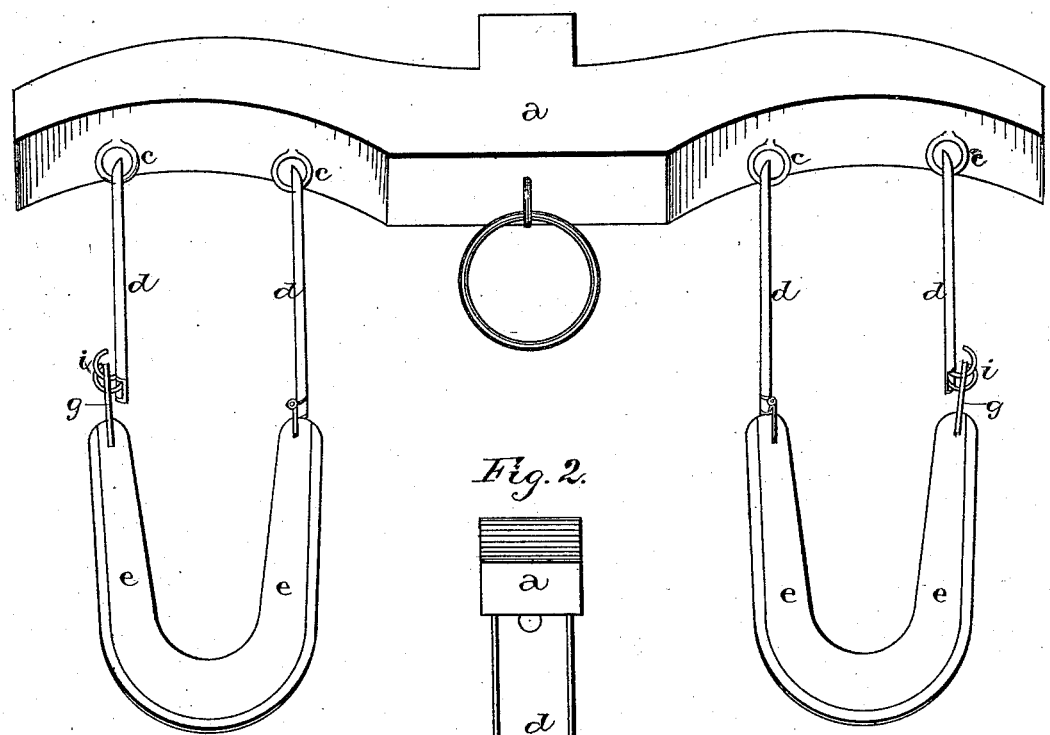
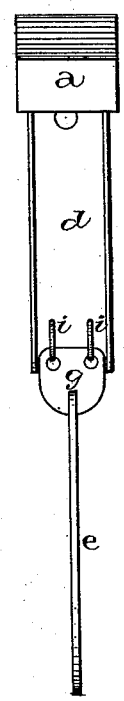
Witnesses:
J. W. Garner
Wm. W. Mortimer
Inventor:
Michele Cantoni
per
F. A. Lehmann, atty.

UNITED STATES PATENT OFFICE.

MICHELE CANTONI, OF BROOKHAVEN, MISSISSIPPI.

IMPROVEMENT IN OX YOKES AND BOWS.

Specification forming part of Letters Patent No. 222,010, dated November 25, 1879; application filed October 16, 1879.

*To all whom it may concern:*

Be it known that I, MICHELE CANTONI, of Brookhaven, in the county of Lincoln and State of Mississippi, have invented certain new and useful Improvements in Ox Yokes and Bows; and I do hereby declare the following to be a full, clear, and exact description of the invention, such as will enable others skilled in the art to which it pertains to make and use it, reference being had to the accompanying drawings, which form part of this specification.

My invention relates to an improvement in ox yokes and bows; and it consists in making each bow of three pieces, which are jointed and hinged together in such a manner as to always accommodate themselves to the movements of the animals, as will be more fully described hereinafter.

Figure 1 is a perspective of my invention. Fig. 2 is an end view of the bow and yoke.

$a$ represents the yoke, which may be constructed as here shown, or in any other way that may be preferred.

Instead of there being two holes through each end of the yoke to put the ends of the bows through in the usual manner, there are two staples, eyes, or other equivalent devices, $c$, in which the two upper parts, $d$, of the bows are hooked. These two parts $d$ are made of sheet or plate iron, and suitably braced by having their edges turned outward, so as to form strengthening-bands, and are made to project downward to about the shoulder-joint of the oxen. These plates $d$ are made nearly as wide as the yoke, and having their edges turned outward so that they cannot catch against the animal's skin in any manner, and, being free to move into almost any position, they accommodate themselves to every movement of the animals, and thus enable the animals to exert themselves much more readily and easily than they can with the common bent inflexible bow.

Hinged to the lower end of each of the inside plates, $d$, is the bow-shaped plate $e$, which passes down under the animal's neck, and which extends at right angles to the two plates $d$, so as to present its flat side for the animal to bear against.

To the free and outer end of each plate $e$ is secured the perforated plate $g$, which extends at right angles to the plate $e$, and catches over the hooks $i$ or other fastenings on the lower end of the outer plate, $d$, for the purpose of fastening the plate $e$ in position on the animal's neck.

To release the animal from the yoke it is only necessary to unfasten the outer end of the plate $e$, and then let it drop down out of the way.

There being four joints to each bow the animal is not cramped or strained in any of his movements, and hence can do much more work in a day, and, the parts being all fastened together, nothing can ever become lost or misplaced, but they are always ready for instant use.

Having thus described my invention, I claim—

1. In an ox-yoke, a bow that is formed from several metallic plates, which are loosely jointed to the yoke and to each other, whereby the animal is always allowed a free movement, substantially as shown and described.

2. The combination of an ox-yoke with a bow composed of the three metal plates $d\ d$ and $e$, which are flexibly connected together, substantially as described.

3. The combination of an ox-yoke with the three flexibly-connected plates $d\ e$, the plates $e$ being fastened at one end by means of a hinge, and at the other by means of the perforated plate $g$ and hooks or catches $i$, substantially as set forth.

In testimony that I claim the foregoing I have hereunto set my hand this 22d day of September, 1879.

MICHELE CANTONI.

Witnesses:
J. M. H. MARTIN,
S. M. FERCICH.